US006686568B1

(12) United States Patent
Hwang

(10) Patent No.: US 6,686,568 B1
(45) Date of Patent: Feb. 3, 2004

(54) COOKING APPARATUS HAVING HEATERS

(75) Inventor: Yun-Ic Hwang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/279,880

(22) Filed: Oct. 25, 2002

(30) Foreign Application Priority Data

Aug. 20, 2002 (KR) ........................................ 2002-49327

(51) Int. Cl.[7] .............................. A21B 1/22; H05B 6/64; F27D 11/02

(52) U.S. Cl. ......................... 219/404; 219/393; 219/411

(58) Field of Search ................................. 219/393, 403, 219/404, 408, 411, 685; 126/190, 192, 340

(56) References Cited

U.S. PATENT DOCUMENTS

| | | | | |
|---|---|---|---|---|
| 2,848,592 A | * | 8/1958 | Mergen | 219/404 |
| 3,281,575 A | * | 10/1966 | Ferguson | 219/404 |
| 4,596,914 A | * | 6/1986 | Morino | 219/404 |
| 4,629,850 A | * | 12/1986 | Tanabe | 219/404 |
| 5,534,681 A | * | 7/1996 | Hwang | 219/404 |
| 5,548,102 A | * | 8/1996 | Kwon | 219/404 |
| 5,747,781 A | * | 5/1998 | Kim et al. | 219/404 |
| 5,793,023 A | * | 8/1998 | Hong et al. | 219/404 |
| 5,968,402 A | | 10/1999 | Lee | |

* cited by examiner

*Primary Examiner*—Joseph Pelham
(74) *Attorney, Agent, or Firm*—Staas & Halsey LLP

(57) ABSTRACT

A cooking apparatus having heaters having a cooking chamber to be closed by a door. The cooking chamber has heaters which are extended to a first position to heat food. When the door is opened in a state of the heaters being extended to the first position, the heaters are moved to a second position, so that a user can safely take the food out of the microwave oven without risk of a burn injury.

21 Claims, 4 Drawing Sheets

COOKING APPARATUS HAVING HEATERS

CROSS-REFERENCE TO RELATED APPLICATION

This application claims the benefit of Korean Application No. 2002-49327, filed Aug. 20, 2002, in the Korean Intellectual Property Office, the disclosure of which is incorporated herein by reference.

BACKGROUND OF THE INVENTION

1. Field of the Invention

The present invention relates to a cooking apparatus, and more particularly, to a cooking apparatus having heaters.

2. Description of the Related Art

In general, a microwave oven is used to heat food by electromagnetic waves generated from a magnetron. Where such a microwave oven is equipped with an additional heater, the microwave oven can further fulfill various cooking modes such as a baking function and a broiling function.

SUMMARY OF THE INVENTION

Accordingly, it is an aspect of the present invention to provide a cooking apparatus having heaters is provided, which are adapted to be moved to a second position apart from a first position to heat food when a door is opened during cooking, thereby enabling food to be safely removed of the microwave oven without a risk of a burn injury.

Additional aspects and advantages of the invention will be set forth in part in the description which follows and, in part, will be obvious from the description, or may be learned by practice of the invention.

In order to accomplish the above and other aspects, a cooking apparatus is provided comprising: a cooking chamber defined in the cooking apparatus; a door provided at a front face of the cooking chamber; and a heater provided in the cooking chamber, which is extended to a first position when food received in the cooking chamber is cooked, and is moved to a second position when the door is opened.

Further, a control device is provided for a cooking apparatus, which includes a cooking chamber defined in the cooking apparatus, a door provided at a front face of the cooking chamber, and a heater provided in the cooking chamber and extended to a first position to heat food received in the cooking chamber, the control device comprising: a sensor unit detecting an opening of the door; and a control unit controlling the heater to be moved to a second position when the opening of the door is detected by the sensor unit.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
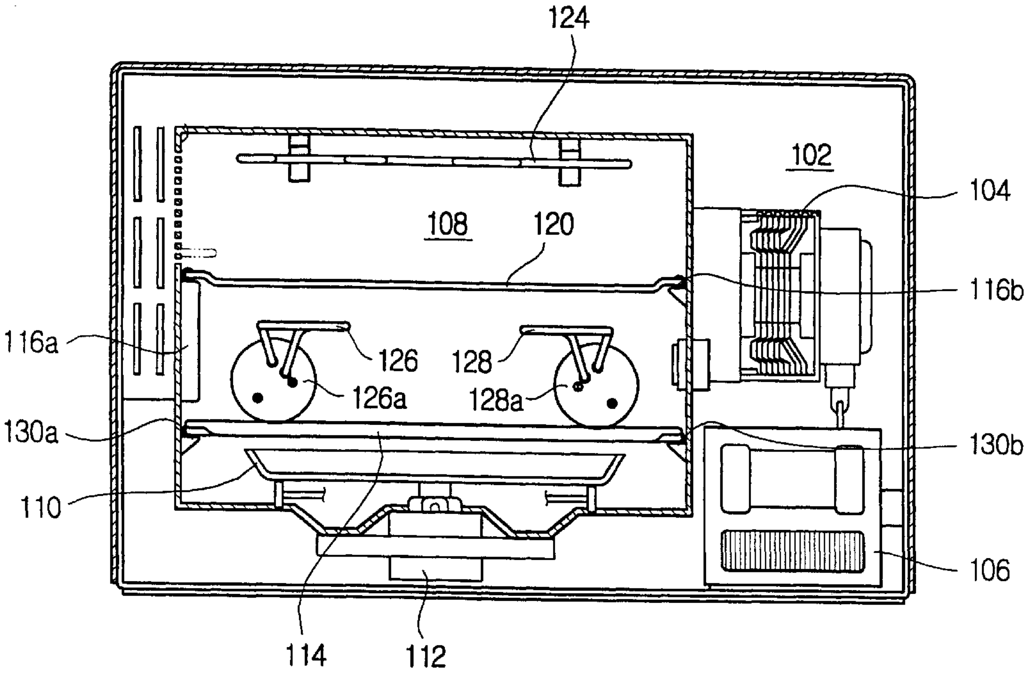
FIG. 1 is a cross-sectional view of a microwave oven having heaters.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows a related microwave oven having heaters, invented by the same inventor as in the present invention, in which a door of the microwave oven is opened. As shown in FIG. 1, an electric component compartment 102 is provided therein with a magnetron 104 to generate electromagnetic waves. The magnetron 104 is supplied with electric power of very high voltage from an electric power supply 106.

A cooking chamber 108 is provided at a bottom surface of the cooking chamber 108 with a glass tray 110, which is used during cooking, as electromagnetic waves generated from the magnetron 104 to cook food. The glass tray 110 is rotated by a motor 112. The cooking chamber 108 is provided therein with an upper heater 124 and a pair of lower heaters 126 and 128. The upper heater 124 is mounted on a ceiling of the cooking chamber 108 to radiate heat toward an upper surface of the food. A grill 120 is disposed below the upper heater 124. The grill 120 is placed on grill supports **116*a* and 116*b* so as to be mainly used in broiling meat or fish. The pair of lower heaters 126 and 128 is disposed below the grill 120. Disposed below the pair of lower heaters 126 and 128 is a plate 114. The plate 114 is placed on plate supports 130*a* and 130*b*** so as to be used in baking such as breads or biscuits.

The pair of lower heaters 126 and 128 is positioned between the grill 120 and the plate 114. In the case of cooking the food on the grill 120, the food, placed on the grill 120, is heated at a lower surface of the food. In the case of cooking the food by the plate 114, the food, placed on the plate 114, is heated at an upper surface of the food. The lower heaters 126 and 128 are coupled to rotating members **126*a* and 128*a*, respectively. Therefore, as the rotating members 126*a* and 128*a* are rotated, the pair of lower heaters 126 and 128 are, respectively, rotated along with the rotating members 126*a* and 128*a*. In FIG. 1, the pair of lower heaters 126 and 128 is shown to be positioned in a cooking mode. When the cooking is finished, a left rotating member 126*a* is rotated counterclockwise along with a left heater 126 of the pair of lower heaters 126 and 128 and thus the left heater 126 moves closer to a left side wall of the cooking chamber 108, while a right rotating member 128*a* is rotated clockwise along with a right heater 128 of the pair of heaters 126 and 128 and thus the right heater 126 moves closer to a right side wall of the cooking chamber 108**.

The invention will be described in further detail by way of example with reference to FIGS. 2 to 4 of the accompanying drawings.

Figure 2:
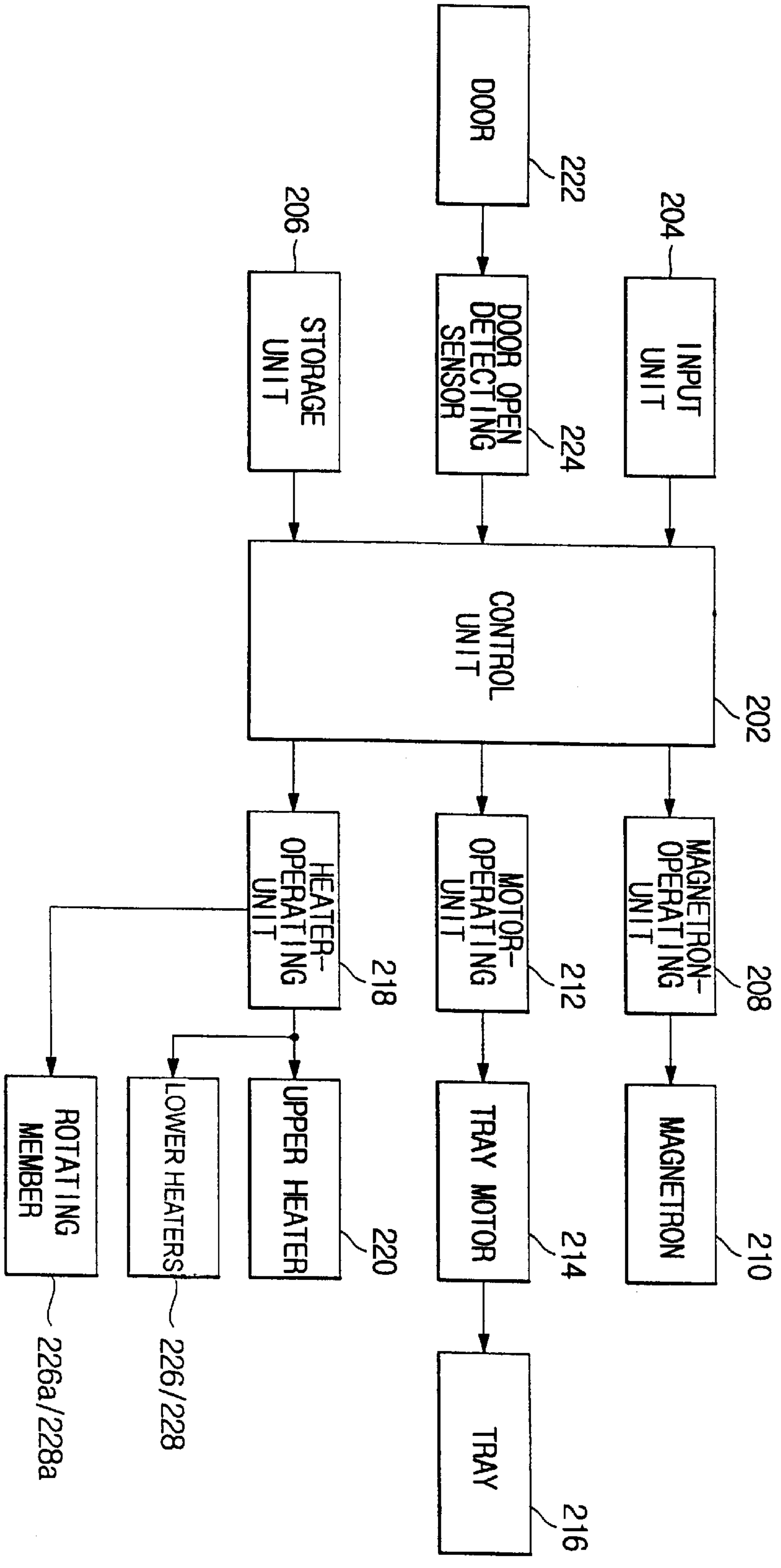
FIG. 2 is a block diagram showing a microwave oven having heaters according to an embodiment of the present invention.

FIG. 2 is a block diagram showing a microwave oven having heaters according to an embodiment of the present invention. As shown in FIG. 2, the microwave oven includes a control unit 202 to control an overall operation of the microwave oven. The control unit 202 is connected at an input terminal of the control unit 202 to an input unit 204, to a door open detecting sensor 224, which detects an opening of a door 222, and to a storage unit 206. The input unit 204 is provided with various keys such as numerical keys and mode selection keys, which allow a user to set a cooking mode and a time. The door open detecting sensor 224 detects the opening of the door 222 and sends a detection signal to the control unit 202. The storage unit 206 stores data required to perform various cooking operations. Power to the upper heater 220 and lower heaters 226 and 228 is controlled by the control unit 202 such that the power to the upper heater 220 and lower heaters 226 and 228 of the microwave oven, when the door 222 is open, is stopped and thereby the upper heater 220 and lower heaters 226 and 228 are prevented from emitting heat, when the door 222 is open. That is, when an opening of the door is detected by the sensor unit, the control unit controls the heater so that an operation to heat the food by the heater is stopped. Further, the cooking apparatus may be prevented from being in a cooking mode, when the door is opened.

A magnetron-operating unit 208, a motor-operating unit 212 and a heater-operating unit 218 are connected to an output terminal of the control unit 202. The magnetron-operating unit 208 serves to drive a magnetron 210 which generates electromagnetic waves. The motor-operating unit 212 serves to drive a tray motor 214, thereby rotating a tray 216 disposed in a cooking chamber 408 as shown in FIG. 4. The heater-operating unit 218 causes the upper heater 220 and the lower heaters 226 and 228 to emit heat, in response to instructions of the control unit 202. In particular, the heater-operating unit 218 controls not only heating conditions of the lower heaters 226 and 228, but also rotating conditions of the lower heaters 226 and 228. More specifically, when the microwave oven is operated in a cooking mode, rotating members 226*a* and 228*a* associated with the lower heaters 226 and 228, respectively, are rotated toward each other to cause the lower heaters 226 and 228 to be extended toward a center of the cooking chamber 408. When the cooking mode is completed, the rotating members 226*a* and 228*a* are rotated in respective reverse directions to cause the lower heaters 226 and 228 to be returned to respective rest positions.

The control unit 202 determines whether the door 222 is opened through the door open detecting sensor 224. If the door 222 is opened during the cooking mode, heating by the upper heater 220 and the lower heaters 226 and 228 is stopped, and the rotating members 226*a* and 228*a* are rotated in the respective reverse directions along with the lower heaters 226 and 228, respectively. As a result, the lower heaters 226 and 228 are returned to the respective rest positions. Further, since the lower heaters 226 and 228 are not extended when the door 222 is opened, a user can take food out of the microwave oven without a risk of a burn injury.

Figure 3:
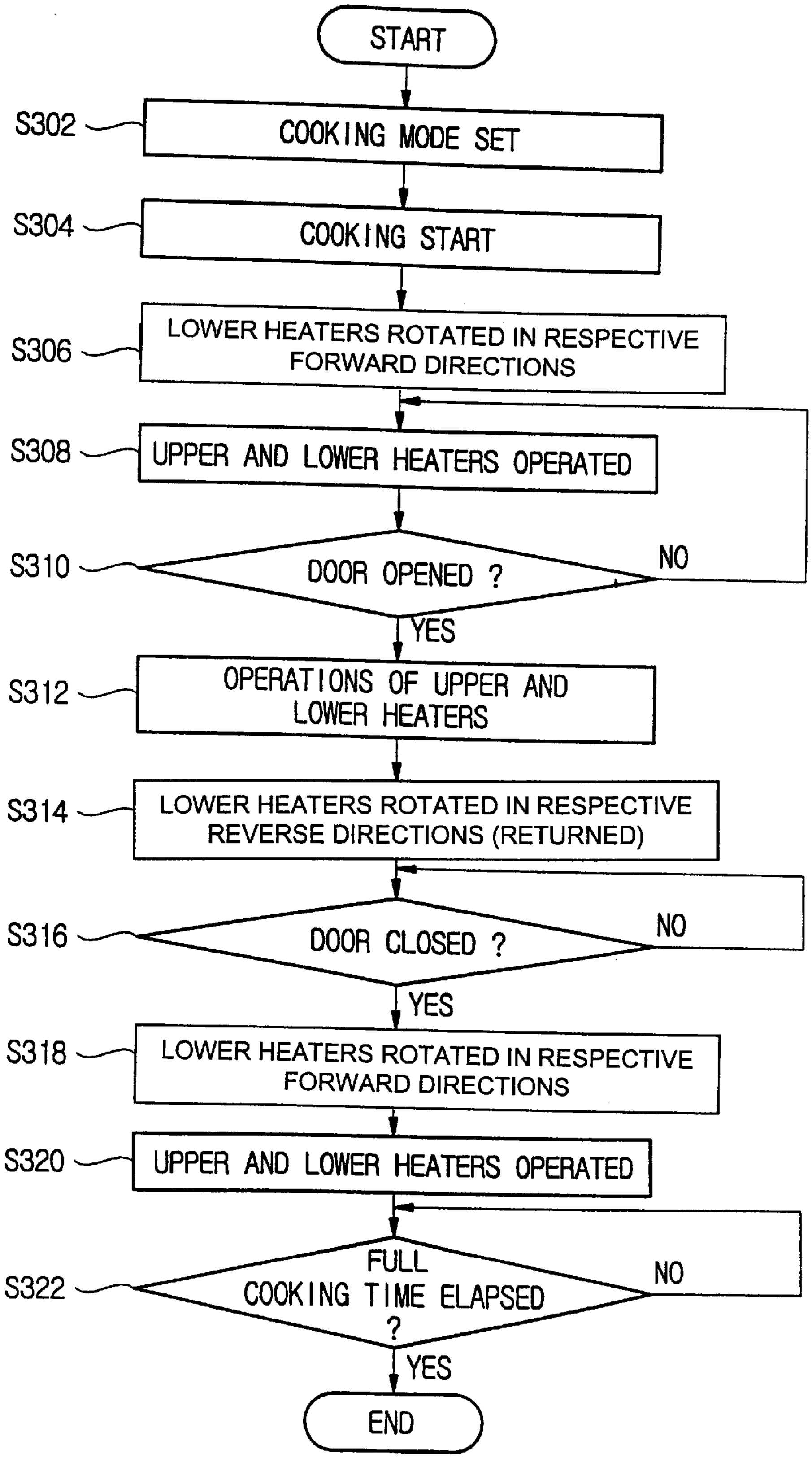
FIG. 3 is a flow chart showing a method of controlling the microwave oven according to the embodiment of the present invention.

FIG. 3 is a flow chart showing a method of controlling the microwave oven according to the embodiment of the present invention. As shown in FIG. 3, when a cooking mode using the upper and lower heaters 220, 226 and 228 is set at operation S302, the control unit 202 starts the cooking mode by using corresponding data stored in the storage unit 206 at operation S304. Upon starting the cooking mode, the control unit 202 controls the rotating members 226*a* and 228*a* to be rotated such that the lower heaters 226 and 228 coupled thereto are extended toward the center of the cooking chamber 408, as shown in FIG. 4, at operation S306. Thereafter, the upper heater 220 and/or the lower heaters 226 and 228 start to radiate heat at operation S308. The control unit 202 controls either the upper heater 220 or the lower heaters 226 and 228 to be operated, or the upper heater 220 and the lower heaters 226 and 228 to be alternately operated according to attributes of the cooking mode. Alternatively, to raise a temperature of the cooking chamber 408 to a high temperature in a short period of time, all of the upper heater 220 and the lower heaters 226 and 228 are operated.

The control unit 202 determines whether the door 222 is opened during the cooking mode at operation S310. If the door 222 is opened, operations of the upper heater 220 and the lower heaters 226 and 228 are stopped at operation S312. Subsequently, the rotating members 226*a* and 228*a* are rotated in the respective reverse directions, and thus the lower heaters 226 and 228 coupled thereto are returned toward respective inner side walls of the cooking chamber 408 at operation S314.

When the door 222 is closed again and an initially set cooking mode has not been completed at operation S316, the control unit 202 controls the rotating members 226*a* and 228*a* to be rotated such that the lower heaters 226 and 228 are extended toward the center of the cooking chamber 408 at operation S318. After extensions of the lower heaters 226 and 228 toward the center of the cooking chamber 408 are completed, the control unit 202 controls the heater-operating unit 218 so that the upper heater 220 and/or the lower heaters 226 and 228 are operated again at operation S320. After the full cooking time has elapsed, the control unit 202 concludes the cooking mode and proceeds to a standby mode at operation S322.

Figure 4:
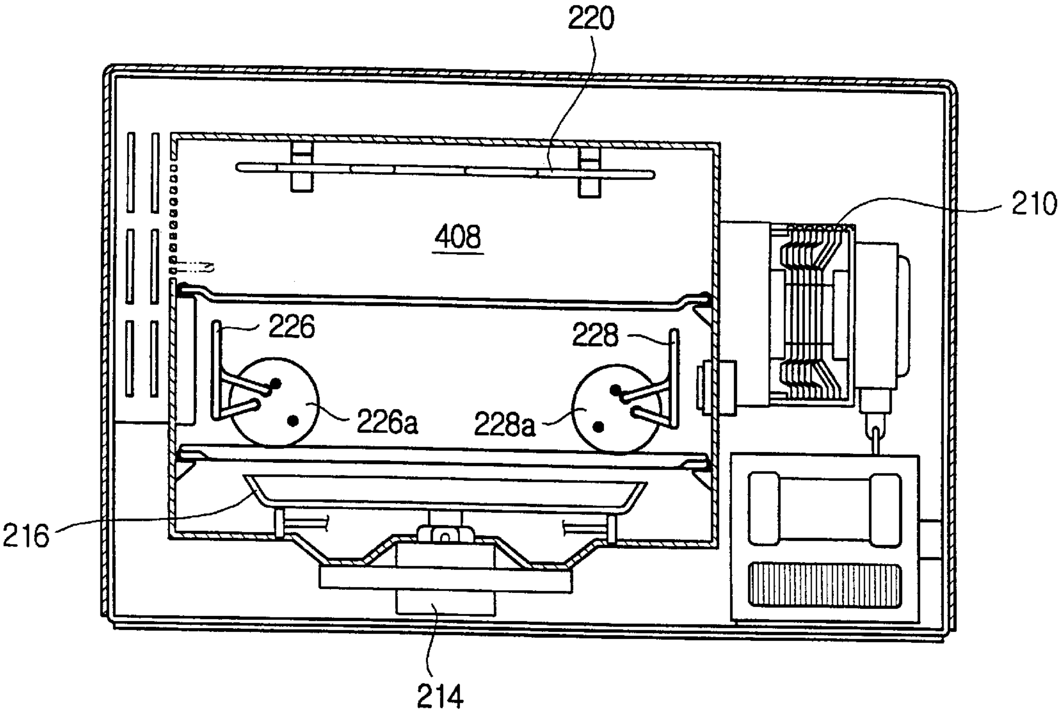
FIG. 4 is a cross-sectional view showing the microwave oven according to the embodiment of the present invention, in which lower heaters are returned to respective rest positions when a door is opened.

FIG. 4 shows the microwave oven according to the embodiment of the present invention, in which lower heaters are returned to the respective rest positions by the rotating members 226*a* and 228*a* when the door 222 is opened. As seen in FIG. 4, since the lower heaters 226 and 228 are moved to the respective inner sidewalls of the cooking chamber 408, a user can safely remove food from the microwave oven without a risk of a burn injury due to a contact with the lower heaters 226 and 228.

As described above, according to a cooking apparatus having heaters, the heaters are moved to a second position apart from a first position for heating the food when a door is opened during cooking. Therefore, the food can be safely removed from the microwave oven without a risk of a burn injury.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking apparatus comprising:

a cooking chamber defined in the cooking apparatus;

a door provided at a front face of the cooking chamber; and a heater provided in the cooking chamber, which is extended to a first position when food received in the cooking chamber is cooked, and is moved to a second position when the door is opened.

2. The cooking apparatus as set forth in claim 1, wherein the first position is located closer to a center of the cooking chamber than the second position.

3. The cooking apparatus as set forth in claim 1, wherein the second position is located substantially at one of inner walls of the cooking chamber.

4. A control device for a cooking apparatus including a cooking chamber defined in the cooking apparatus, a door provided at a front face of the cooking chamber, and a heater provided in the cooking chamber and extendable to a first position to heat food received in the cooking chamber, the control device comprising:

a sensor unit detecting an opening of the door; and a control unit controlling the heater to move to a second position when the sensor unit detects the opening of the door.

5. The control device as set forth in claim 4, wherein when the opening of the door is detected by the sensor unit, the control unit controls the heater so that an operation to heat the food by the heater is stopped.

6. The control device as set forth in claim 4, wherein when the door is closed and the heater is in the second position or is being moved to the second position, the control unit controls the heater to be extended to the first position.

7. A cooking apparatus having a cooking chamber therein and a door at a front face thereof, comprising:

a heater provided in the cooking chamber, which is moved to a first position when the cooking apparatus is in a cooking mode, and is moved to a second position when the door is opened to ensure a sufficient space to safely remove food from the cooking chamber.

8. The cooking apparatus as set forth in claim 7, wherein the cooking apparatus is not in the cooking mode, when the door is opened.

9. The cooking apparatus as set forth in claim 7, wherein the first position is located closer to a center of the cooking chamber than the second position.

10. The cooking apparatus as set forth in claim 7, wherein the second position is located substantially at one of inner walls of the cooking chamber.

11. The cooking apparatus as set forth in claim 7, wherein the heater is moved by a rotation of the heater.

12. The cooking apparatus as set forth in claim 7, wherein in the door is opened, power to the heater to heat the cooking chamber is stopped.

13. The cooking apparatus according to claim 7, further comprising:

a control unit to control a position of the heater; and a rotating member coupled to the heater and under the control of the control unit rotating the heater in the cooking chamber.

14. A control device for a cooking apparatus, the cooking apparatus including a cooking chamber therein and a door provided at a front face thereof, and a heater provided inside of the cooking chamber, the control device comprising:

a sensor unit detecting an opening of the door; and a control unit controlling the heater to move the heater away from a center of the cooking chamber when the sensor unit detects the opening of the door.

15. The control device as set forth in claim 14, wherein when the door is closed and the heater is in a position away from the center of the cooking chamber or is being moved to the position away from the center of the cooking chamber, the control unit controls the heater to be moved to a position toward the center of the cooking chamber.

16. A control device for a cooking apparatus including a cooking chamber therein, a door provided at a front face thereof and a rotatable heater in a cooking chamber of the cooking apparatus, comprising:

a sensor unit detecting an opening of the door; and a control unit controlling the heater to be rotated away from a center of the cooking chamber when the sensor unit detects the opening of the door.

17. A method of controlling a cooking apparatus having a cooking chamber therein, a door provided at a front face thereof and a heater in a cooking chamber of the cooking apparatus, comprising:

detecting an opening of the door; and controlling the heater by moving the heater away from a center of the cooking chamber when the opening of the door is detected.

18. A method of controlling a cooking apparatus having a cooking chamber therein, comprising:

detecting an opening of the door;

after said detecting moving the heater to a first position when the door is opened to ensure a sufficient space to safely remove food from the cooking chamber; and when the door is closed and the cooking apparatus is in a cooking mode, moving the heater to a second position, which is closer toward a center of the cooking chamber than the first position.

19. A cooking apparatus with a cooking chamber therein, comprising:

at least two heaters movably provided in the cooking chamber and when a cooking mode is initiated, the at least two heaters are rotated in directions away from walls of the cooking chamber.

20. A cooking apparatus with a cooking chamber therein, comprising:

a door provided at a front face of the cooking apparatus; and at least two heaters movably provided in the cooking chamber and when the door is opened, the at least two heaters are rotated in respective directions from respective first positions to respective second positions so as to ensure sufficient space to safely remove food from inside of the cooking chamber.

21. The cooking apparatus according to claim 20, wherein when the door is opened the at least two heaters the at least two heaters are rotated in the respective directions from respective the first positions to respective the second positions in which the respective second positions are closer to respective inner side walls of the cooking chamber.

* * * * *